Sept. 5, 1939.   A. W. MILLS   2,172,067
ACCOUNTING MACHINE
Filed Oct. 11, 1935   5 Sheets-Sheet 1

FIG.1

INVENTOR.
Albert W. Mills
BY
ATTORNEY

FIG. 2

Sept. 5, 1939.  A. W. MILLS  2,172,067
ACCOUNTING MACHINE
Filed Oct. 11, 1935  5 Sheets-Sheet 3

INVENTOR.
Albert W. Mills
BY A.C. Maby
ATTORNEY.

Patented Sept. 5, 1939

2,172,067

UNITED STATES PATENT OFFICE 2,172,067

ACCOUNTING MACHINE

Albert W. Mills, Endicott, N. Y., assignor to International Business Machines Corporation, New York, N. Y., a corporation of New York Application October 11, 1935, Serial No. 44,506

8 Claims. (Cl. 235—61.8)

This invention relates to accounting machines and more particularly to perforated-card-controlled tabulating machines.

An object of the invention is to devise means for actuating the accumulating wheels for adding without the necessity of rocking the wheels into and out of mesh with actuating racks or gears.

Another object is to devise an accumulator actuator comprising a constantly rotating member having radiating pins or spokes which may be moved into cooperation with the accumulator wheels or pinions to actuate the same.

Another object is to devise means for accumulating credit and debit values with mechanism of this kind and for automatically determining as between a credit accumulator and a debit accumulator, which contains the difference between the values accumulated by the two.

Another object is to devise means for printing totals from the accumulators.

Other objects will appear in the following description of the invention.

Referring to the drawings:

Fig. 2 is a section taken on line 3—3 of Fig. 1, showing the accumulators and their actuators and associated elements;

In the drawings, the accumulator pinions or wheels are shown at 1, loosely mounted on shaft 2 and cooperating with a roller 3 carried by an arm 4 pivoted at 5. A spring 6 connected to arm 4 holds the roller 3 against the pinion 1 to prevent accidental turning. A wheel 7 fixed on shaft 7a carries a plurality of radially projecting pins 8. There are two sets of these pins adapted to actuate two pinion wheels simultaneously. The pins 8 may be attached at their inner ends to the ring portion 9 of the wheel while the other ends reach through holes or slots 10. These slots permit lateral movement of the pins 8. The pins are adapted to act as gear teeth to turn the pinions 1 as the wheel 7 turns. Normally, the pins are out of the plane of the pinions 1 so that as the pin wheel turns, it has no effect upon the pinion wheels. By moving one or more of the pins laterally prior to engaging the teeth of the pinion 1, they will cooperate with the teeth of the pinion and turn the same one or more tooth spaces for accumulating. The lateral movement of the pins 8 is effected by a camming arm 11 pivoted at 12 and provided with cam surfaces 13 between which the pins 8 pass when adjacent to the accumulator pinion wheels.

Figure 4:
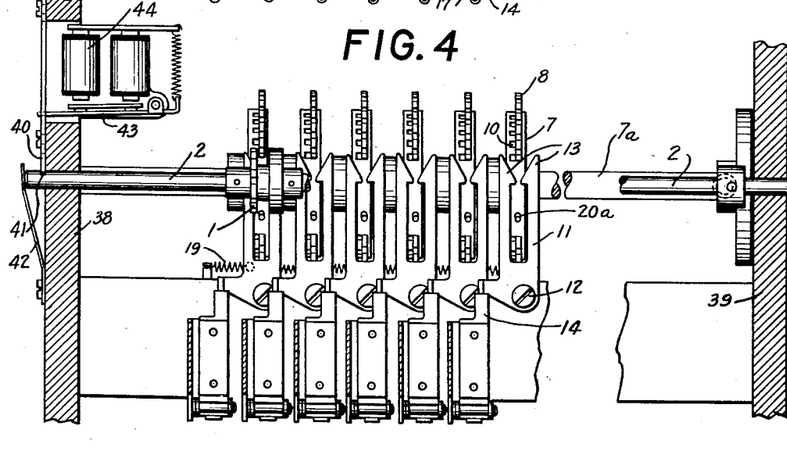
Fig. 4 is a section taken on line 4—4 of Fig. 1 showing in greater detail the means for controlling the actuators.
Figure 5:
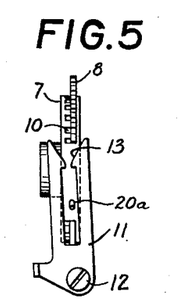
Fig. 5 is a detail of the means for controlling the actuators for causing them to cooperate with the accumulator pinions.

The cam arms 11 are normally held in the position of Fig. 4 by a latch member 14 attached to the armature 15 of an electromagnet 16. The armature is pivoted at 17 and held normally in latching position by a spring 18. A spring 19 is adapted to rock the cam arm 11 counterclockwise in Fig. 4 when the arm is released by the latch 14. This will place the cam faces 13 in position to move the teeth 8 slightly to one side as they pass between the cam faces. Each tooth which is thus moved to the side by the cam arm 11 cooperates with a tooth on the pinion 1 and rotates the latter one tooth space.

In the operation of the machine, a perforated control card is fed through the machine synchronously with the rotation of the pin wheel 7 and a perforation position in a particular column on the card passes a sensing brush as a corresponding one of the pins 8 is approaching the cam surfaces 13. When a perforation is sensed by the brush in one of the several perforation positions in the column, a circuit is closed through the operating magnet 16 and the latch 14 is moved to release the cam arm 11 which is then actuated by its spring 19. The cam arm 11 remains in this moved position during the remainder of the particular card cycle so that from the point that the perforation was encountered, to the end of the cycle, all pins passing between the cam faces 13 will be rocked into cooperation with the pinion teeth and the pinion will be moved a number of steps corresponding to the number of pins 8 engaging the pinion during the card cycle. In other words, assuming that a column on the record card has nine perforation positions representing the nine digits from one to nine and that the card is fed with respect to the sensing brushes so that the nine position passes under the brush first, followed by the eight position and so on down to the one position, the pin wheel is so timed that the nine pin will be approaching the cams 13 at the moment that the nine perforation position is being sensed by the sensing brush. The eight pin in like manner approaches the cams 13 as the eight perforation position in the column is being sensed by the sensing brush, etc. Now if a perforation is sensed by the sensing brush in the six position, the magnet 16 will be energized, causing the cam arm 11 to be moved to the side just as the six pin is approaching the cams 13. This pin, then, will be moved to one side and will engage one of the teeth of the pinion 1 to turn the pinion one step. As the cam arm remains in this set position the five pin also will be cammed to one side and will, in turn, actuate the pinion one step, the four, three, two, and one pins will, in like manner, be cammed to the side and will each operate the pinion one step so that it will be turned six steps in all. In this manner, the pinion 1 will be turned a number of steps corresponding to the position of a perforation in the column on the record card.

After the one pin has actuated the pinion, a stud 20 carried by the wheel 7 will engage the cam face 13, and being rigidly mounted in the wheel, will not be moved by the cam but will itself move the cam on its pivot 12 back to its normal position where it will be latched by the latch member 14, so that as the pin wheel 7 continues to rotate, no further operation of the pinion 1 will take place.

Following the stud 20 on the pin wheel 7 is an additional actuating pin 8a. This pin is for the purpose of effecting carrying into the pinion from the pinion of the next lower order. If carrying is to be effected in any particular order, the magnet 16 of that order will be energized just after the stud 20 has restored the cam 11 to latched position and as the pin 8a is approaching the cam faces 13. Thus, the pin 8a will be moved to the side so as to turn the pinion an additional step representing the carrying of one into the pinion.

It will be understood that while one set of actuating pins 8 is passing one accumulator pinion belonging to one set of the accumulator pinions, the opposite set will be passing the opposite accumulator pinion belonging to an entirely separate set of accumulator pinions. Then, during the next cycle of operation of the machine, a set of actuating pins 8 will be in position to actuate the pinion previously actuated by the other set of pins 8. In other words, during one cycle of operation a set of pins 8 will serve to operate a pinion wheel of one accumulator and during the next machine cycle, the other set of pins 8 carried by the same wheel 7 will serve to actuate the same accumulator pinion.

It should also be understood that the cam faces 13 of cam arms 11 are provided to not only cam the pin 8 into engagement with the pinions 1 but are also adapted to cam back the previously shifted pins. For example, if certain pins 8 had been shifted to actuate the pinions 1 at the left in Fig. 1 these pins will be cammed back to normal position by the cam face 13 of the cam arm 11 associated with the pinions 1 at the right in Fig. 1 (provided that the magnet 16 of the related order has not been energized by the time the shifted pins 1 reach such position). This will prevent the undesired actuation of an accumulator by the pre-set pins 8 when it is not required that they do so.

Fixed with respect to each pinion wheel 1 is a carry wheel 21 cooperating with a projection 22 on arm 23 also pivoted at 5 and having a projection 24 cooperating with a latch member 25. A spring 26 connected between the arm 23 and latch arm 25 serves to rock the arm 23 to hold the projection 22 against the carry cam wheel 21 when the projection 24 is not latched by the latch 25. The spring also serves to hold the latch 25 in latching position to hold the projection 22 away from the cam wheel 21 when it is latched by the latch member 25. Normally, the arm 23 is not latched and the projection 22 rests against the periphery of the wheel 21. This is adapted to hold the central leaf 27 of contacts 28, 29 in neutral position. When the pinion 1 reaches the position representing the value "9", a depressed position 30 on the cam wheel 21 will cooperate with the projection 22 of the cam arm 23 and permit the latter to move inwardly slightly so as to close contacts 28. Then as the pinion wheel moves another step to the tenth or, in other words, zero position, the high point 31 of the cam wheel 21 will rock the carry arm 23 outwardly, thus opening contacts 28 and closing contacts 29.

The latch 25 will latch the carry arm 23 in this position so that the pinion 1 may continue to turn leaving the arm 23 in latched position with contacts 29 closed. The reason for closing the contacts 28 when the pinion wheel is in the "9" position, and contacts 29 when the pinion passes to zero position, will be more fully described in connection with the wiring diagram presently, it being sufficient to state here that the closing of contacts 28 when the pinion is in the "9" position prepares a circuit to effect carrying from this particular order to the next higher order if an order while standing at "9", receives a carry from the next lower order. The closing of the contacts 29 prepares a circuit to effect carrying from the particular order to the next higher order at the proper moment in the machine cycle.

After the carry operation, the cam arm 11 is again restored to latched position by a second pin, 20a.

Before the beginning of the next machine cycle, contacts 29 will be opened and the central leaf 27 will return to its normal position with both contacts 28, 29 open. This is effected for each of the two accumulators by a cam rod 32 carrying a fixed arm 33 adapted to be engaged by a stud 34 carried by gear 35 on the shaft 7a. Stud 34 rocks the arm 33 so that the cam 32 will rock all of the latches 35 and thus release all of the projections 24 on arms 23 so that these arms will also return to their normal positions.

Subtracting

The accumulators may be employed to perform subtracting operations by adding into them complements of the true members. In order to do this, if a number is to be subtracted, some designation will be contained in the card in the form of a special control perforation, usually a perforation in the X position in one of the columns.

This perforation will be sensed by the upper brushes before the sensing of the numerical data by the lower brushes begins and this will bring about a shifting of the accumulator wheels laterally so that they will be brought into the plane of the actuating pins 8 just prior to the beginning of the accumulating portion of a cycle. Then as each pin 8 passes its accumulator pinion wheel 1, it will engage the wheel and turn the latter one step. The accumulator wheels of each order will thus continue to be turned until the perforations in the various data columns are sensed by their sensing brushes effecting energization of their particular magnets 16 to cause the usual setting of the cam arms 11 which will move the pins 8 to one side in the usual manner. In this instance, the pins 8 being in the plane of the accumulator wheels will now be moved out of the plane of the pinions and will not operate the latter. Thus, if a column contains a perforation at the four index point position and the amount is to be subtracted from the accumulator wheel, the wheel begins to turn as soon as the nine pin reaches it and will continue to turn one step for each of the pins 9, 8, 7, 6, and 5. The perforation in the four position now throws the pins out of cooperation with the pinion wheel and the latter will thus have moved five steps which is the nines complement of the value 4.

Carrying in the case of subtracting is the same as when adding, the carry wheel 21 causing closure of contacts 28 when standing in the 9 position and then opening these contacts and closing contacts 29 when it moves to the zero position.

The drive

Figure 7:
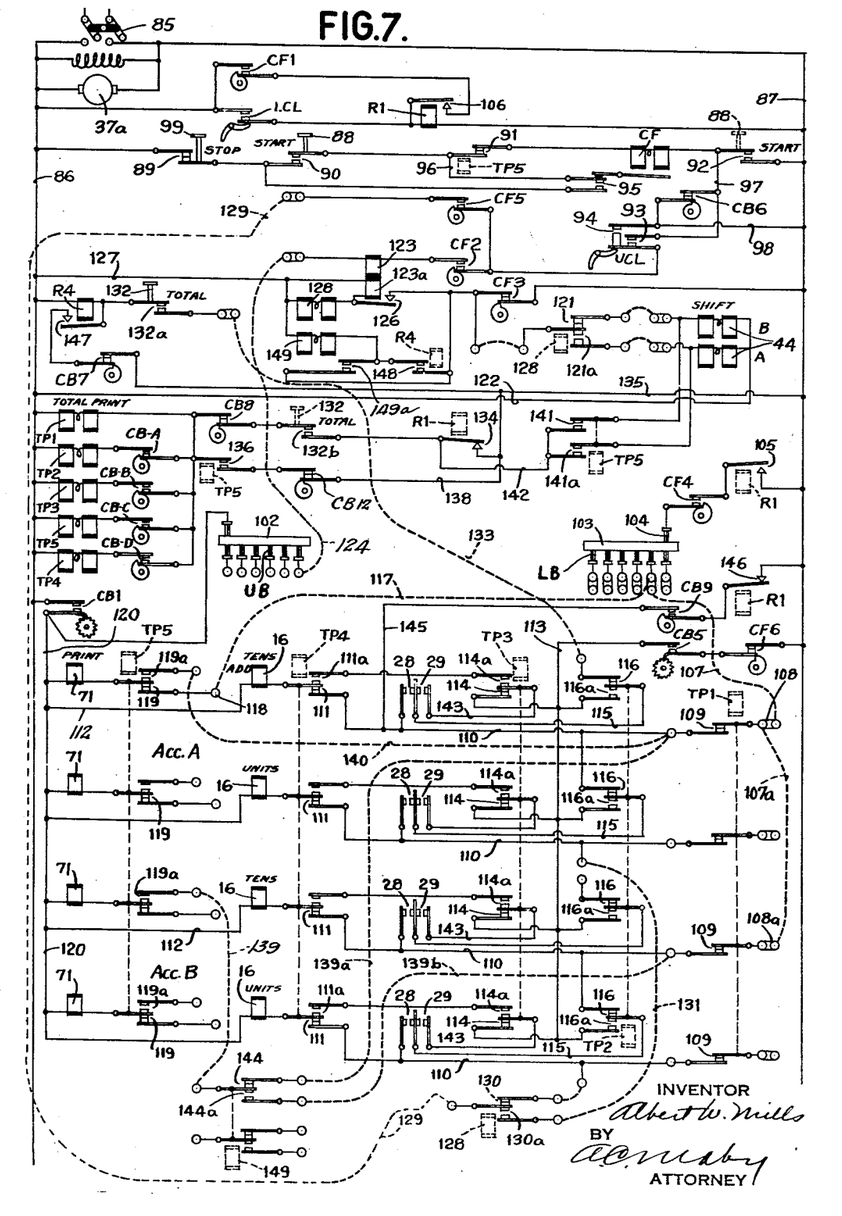
Fig. 7 is an electric wiring diagram illustrating the operation of the machine.
Figure 8:
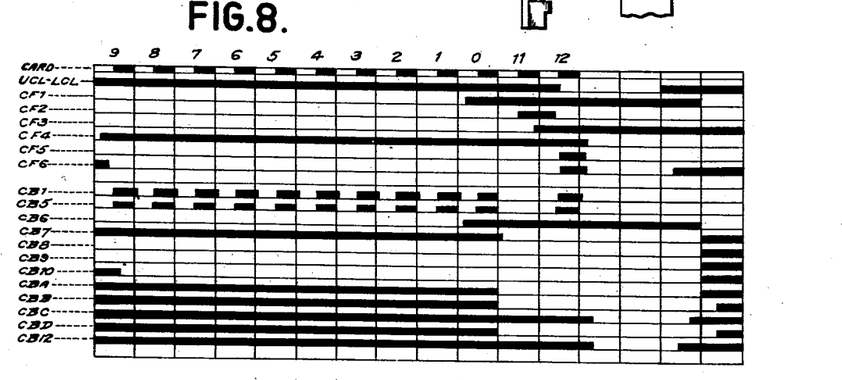
Fig. 8 is a timing diagram of the contact making devices of the machine.

The actuating pin wheels 7 are turned by means of the gear wheel 35 fixed on the shaft 7a and meshing with a gear 36 fixed on the main shaft 37 which may be operated by suitable connection to the driving motor 37a shown in the wiring diagram of Fig. 7.

Figure 3:
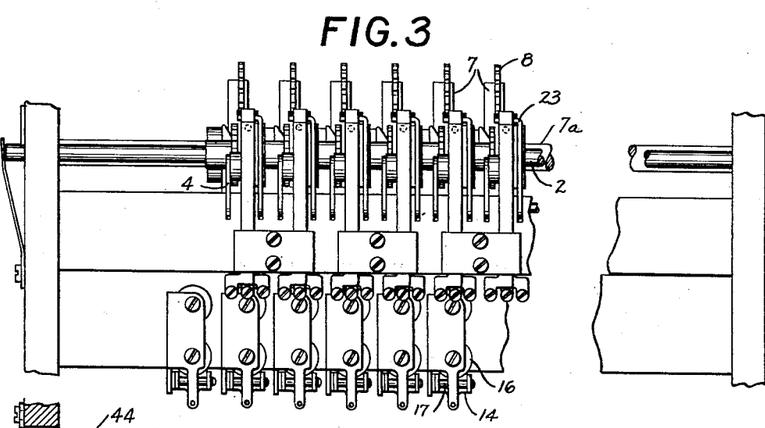

In order that the accumulator pinions may be shifted laterally so as to be brought into the planes of their respective actuating pin wheels 8, the shafts 2 on which the pinions are mounted are loosely carried in the end plates 38, 39 and are normally locked by a latch 40 cooperating with a notch 41 in the shaft 2. A spring 42 tends to move the shaft 2 to the right as viewed in Figs. 3 and 4. This will move all of the accumulator pinions into the plane of the actuating pins 8. The armature 43 of an electromagnet 44 is adapted to lift the latch 40 to release the shaft 2 so that it may be shifted by the spring 42. At the end of the accumulating cycle, the accumulating pinions will be restored to their normal position out of alignment with the pin wheel by a cam 45 carried on shaft 7a. This cam cooperates with a follower 46 fixed on the pinion shaft 2. When the shaft is released by the latch 40 and moves to the right, the follower 46 moves into the depressed portion of the cam 45 and at the end of the cycle is restored toward the left by the cam and the latch 40 cooperates with notch 41 to hold the shaft in its normal position.

Balance accumulating

The machine may be employed to accumulate credit and debit values on two separate accumulators. One of the sets of accumulator pinions is designated generally A and the other B. Assuming that the A accumulators are to be used as credit accumulators and that the B accumulators are to be employed for debit values, the machine will be so set up that as each card is sensed, if the value is a credit, the true amount will be added in the A accumulators and the complement of this amount will be added in the B accumulators. Then when a debit card is sensed, an X control perforation indicating this fact will cause the true value to be accumulated in the B accumulator and the complement thereof added in the A accumulator.

When the complement is to be added in the B accumulator, the latter will be shifted while the A accumulator wheels will remain in their normal positions. On the other hand, if the value is a debit value, the B accumulator wheels will remain in their normal positions while the shaft with all of the A accumulator pinion wheels will be moved to bring the pinions into normal engagement with the actuating pin wheels 8 to receive the complement.

Printing

Printing is effected by separate type elements 47 carried by a type bar 48 hinged to an arm 49 pivoted at 50. A spring 51 normally holds a projection 52 on the bar 48 in a notch 53 in the sector arm 54. Arm 54 is fixed to the shaft 50 and constrained to move therewith so that as the shaft 50 rocks counterclockwise, it will raise the type bar causing the type elements to move in succession past the printing position with respect to the platen 55. The shaft 50 is operated through an arm 56 fixed thereto and connected by a link 57 to an arm 58 pivoted at 59 and having a cam follower 60 cooperating with an actuating cam 61 fixed on the drive shaft 37. A spring 58a serves to lift the link 57 and the cam 61 restores the link and associated parts. This causes the shaft 50 to oscillate to move the type bar causing all of the type elements 47 to pass through the printing position and then to restore the type bar to its normal lowered position as in Fig. 1. The lower end of the type bar 48 is connected by a link 62 to an arm 63 pivoted at 64 and provided with ratchet teeth 65. There is one tooth 65 for each type element 47. As each type element is approaching the printing line, a corresponding one of the ratchet teeth 65 is approaching a stop pawl 66. The pawl is normally latched by member 67, the two parts having an interconnecting actuating spring 68. The latch 67 is connected by a wire 69 to the armature 70 of an electromagnet 71.

The movement of the type bar is synchronous with the operation of the pin wheel 7 which as we have seen operates synchronously with the successive sensing of perforation positions on the card. The electromagnet 71 is connected to the perforation sensing brushes in the same manner that electromagnet 16 is connected to the brushes. Thus, when a perforation is sensed the energization of magnet 71 moves the latch 67 out of cooperation with the latching pawl 66 and the spring 68 causes the pawl to move into engagement with the ratchet teeth 65. This stops the arm 63 and as the shaft 50 continues to turn counterclockwise with the sector 54, lifting the type bars 48, the particular type bar connected to the ratchet teeth 65 which has now been latched by pawl 66, cannot rise any further. The upward pressure of the sector 54 against the projection 52 while the link 62 is in effect pulling in the opposite direction, causes the type bar to rock clockwise about its pivot 72 and the type is in this manner thrown against the platen 55 to effect printing on a report sheet carried by the platen. The character printed will correspond to the value represented by the perforation in a column on the record card. This, of course, is the same value that is run into the accumulator pinions under control of the pin wheel. Integral with each sector 63 is a cam member 73 against which a finger 74 is pressed by a spring 75. The arrangement of the type elements 47 on the type bar is such that the uppermost type is the nine digit followed by the 8 digit and so on to the lowermost element which is the zero type. If a type bar is permitted to rise its full distance without being stopped by energization of the operating magnet 71, the finger 74 will ride upwardly into the notched portion 76 of the cam 73. Each of the fingers 74 is provided with a lateral projection 77 reaching across the adjacent finger 74 of the next lower order.

If any type bar is stopped by operation of the magnet 71 in a position to print a significant character the associated cam 73 will, of course, not move far enough to permit its finger 74 to ride into the notch 76. The projection 77 on this particular finger 74 will then prevent the adjacent finger 74 in the next lower order from rocking into the notch 76 of its cam 73. This will cause the projection 78 on the cam member 73 of such next lower order to strike the end of the finger 74 and thus stop the movement of the sector arm 63 and also the type bar 48 before the sector arm 54 has completed its upward stroke. This will cause the type bar to be cammed out to effect printing. The character thus printed will be zero. This causes printing of zeros to the right of any significant figure that is printed by operation of its type bar 48. As the sectors 54 are restored by the action of the cam 61, they will engage the upper part of projection 52 on the type bars and restore the latter to their normal position, the springs 51 moving the projections 52 back into the notches 53.

The latching pawls 66 are restored by a common bail 79 secured to a rod 80 and secured to the rod 80 is an arm 81 to which is connected a link 82 which is in turn connected to a cam follower arm 83 cooperating with a cam 84 on the shaft 37.

*Wiring diagram*

In Fig. 7, the main driving motor is shown at 37a and is associated by suitable driving connections, not shown, with the driving shaft 37. Closure of the main switch 85 supplies current to the opposite sides 86, 87 of the line. This then causes the motor to operate so that the shaft 37 rotates continuously as long as the switch 85 is closed.

In order to feed cards through the machine and to cause the accumulation and printing of data sensed in the card, the start button 88 is depressed. This closes a circuit through the card feed clutch magnet CF as follows: from the line 86, through normally closed contacts 89, start contacts 90 now closed, normally closed contacts 91, card feed clutch magnet CF, start contacts 92 now closed, to the line 87. When the first card reaches the upper card lever UCL, it will cause closure of contacts 93, 94. Each card fed will now close these contacts for the greater part of a card cycle of operation of the machine. Between cards, these contacts are open for a short portion of the cycle as is more fully shown and described in the patent to C. D. Lake et al. No. 1,976,617, dated October 9, 1934, and particularly at lines 119 to 123 of page 3 of the aforementioned patent. During this short portion, the contacts CB6 will be closed by their cam which together with the other cams controlling the CB contacts are carried by the shaft 37. After the first card reaches the upper card lever then, the operator may release the start button 88 and the circuit through the card feed clutch magnets CF will then be from the line 86, through contacts 89, contacts 95, which are closed by the feed card clutch magnet CF, then through wire 96, contacts 91, magnets CF, wire 97, contacts 93 to contacts 94, wire 98 to the other side of the line. During the short interval that contacts 93, 94 are open, the circuit will be shunted around these contacts by passing from wire 97 to contacts CB6, wire 98 to the line 87. Should cards fail to feed, the upper card lever will permit contacts 93, 94 to open and the circuit through the magnet CF will be broken and the card feed mechanism will stop operating.

The operator may stop the card feed mechanism at any time by pressing the stop key 99 to open the circuit at contacts 89.

Figure 6:
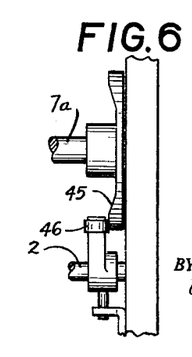
Fig. 6 is a detail view of a camming device for moving the accumulator wheels laterally to effect subtracting operations and also for totaling operations.
Figure 9:
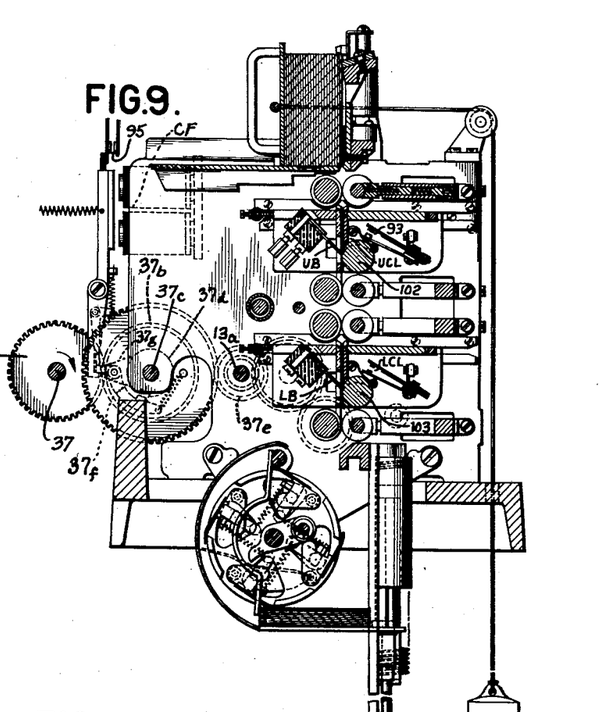
Fig. 9 is a view in side elevation of one type of card feeding mechanism which may be used in connection with the present embodiment.

Any suitable card feeding mechanism may be employed in connection with the present machine and is preferably of the type fully shown and described in the patent to C. D. Lake et al. No. 1,976,617, dated October 9, 1934. The construction of this card feeding mechanism is also shown in Fig. 9 wherein it will be seen that the cards are fed singly from a supply stack past the upper brushes UB and then to the lower brushes LB and then to a card stacking mechanism. The card is adapted to rock the card lever UCL to close card lever contacts 93 (and 94 not shown in Fig. 6) when the card passes the upper brushes UB and also to rock the card lever to close the card lever contacts LCL when the card passes the brushes LB.

In Fig. 9, there is also disclosed the constantly rotating shaft 37 to which is secured a gear 37a and which meshes with a gear 37b loosely mounted upon a shaft 37c. Fixed to the gear 37b for rotation therewith is a single notched clutch 37d, it being understood that the clutch disk 37d constantly rotates. The card feed magnet CF is adapted, as is well known, to release a clutch arm so that a clutch tooth of the clutch pawl 37f carried by an arm 37g secured to the shaft 37c will enter the notch of the clutch disk 37d at a predetermined position in the rotation of the clutch disk 37d. The shaft 37c is the card feeding shaft of the machine and carries the cams which control the CF contacts, it being obvious that the clutch connection to the shaft 37c can only be effective at a predetermined point in the rotation of the shaft 37 and since the latter carries the cams which control the CB contacts, it will be seen that the desired synchronism between the main operating shaft and the card feeding shaft is preserved irrespective of the time that the start key is depressed.

The shaft 37c has secured thereto a gear which meshes with a pinion 37e attached to a shaft 13a. This provides the desired driving gear ratio between the shaft 37c and the shaft 13a so as to drive the shaft 13a the required number of revolutions. The shaft designated 13a herein corresponds to the shaft designated "13" in the aforementioned Patent No. 1,976,617 and from said shaft 13a herein the driving connection for the card feeding mechanism is the same as that shown and disclosed in the Patent 1,976,617.

When the machine is being operated to take a total the card feeding mechanism will be idle. In order to prevent accidental starting of this mechanism while totaling operations are being performed, the contacts 91 will be automatically opened by the TP5 magnet. This magnet as will be pointed out presently is energized whenever the machine is set for totaling.

The sensing of perforations in the cards is effected by a set of upper sensing brushes UB and a set of lower sensing brushes LB. These brushes cooperate with common contact rollers 102, 103 repectively. The cards are first fed between the brushes UB and common contact 102 and then between the lower brushes LB and common contact 103. The manner in which this sensing is done is well known in this art. While one card is being sensed by the brushes LB, the card following is being simultaneously sensed by the upper brushes UB. The sensing is synchronous or, in other words, as the successive index points in the various columns are being sensed by the lower brushes LB corresponding index points on the card following are being simultaneously sensed by the upper brushes UB.

Current is supplied to the common roller 103 by a brush 104 connected to the line 87 through cam contacts CF4 and lower card lever contacts 105. The CF4 cam and other cams controlling the other CF contacts are carried on the card feeding shaft 37c of the machine and the CF4 cam is timed to close its contacts during that portion of the cycle in which a card is between the brushes and the roller 103. Contacts 105 are held closed as long as the lower card lever relay R1 is energized.

The lower card lever LCL is operated by the cards being fed through the machine to close the LCL contacts. This closes a circuit through the relay magnet R1 which, in turn, closes contacts 106. Cam contacts CF1 are closed during the portion of the cycle when the lower card lever is not actuated by cards to close the LCL contacts. Thus, when the LCL contacts open for a portion of each cycle, current is supplied to the relay magnet R1 from line 86, through contacts CF1, contacts 106, relay R1 to line 87. If cards fail to feed past the lower card lever, relay R1 will become deenergized and contacts 105 will open and this will discontinue the current to the common roller 103 so that no circuit will be closed through the brushes LB.

The accumulating magnets 16 may be connected to the brushes LB by plug connections 107. Any one of the columns on a card may be caused to control any order of any accumulator by connecting the appropriate brush LB to the appropriate plug socket 108.

As the card is passing the brushes LB, when a perforation is encountered in a column the circuit will be closed through the particular brush and corresponding accumulator magnet as follows: tracing the circuit backward from line 87 it passes through contacts 105, CF4 contacts, brush 104, roller 103, through the perforation to the corresponding brush LB, plug connection 107 to socket 108, through contacts 109 normally closed, wire 110, contacts 111 normally closed, accumulator magnet 16, wire 112, circuit breaker contacts CB1 to the line 86. This energizes the accumulator magnet 16 at the proper moment to effect accumulation of the value represented by the position of the perforation as described.

*Carrying*

Assuming that the units order accumulator pinion 1 has turned to or through its zero or ten position and has closed its carry contacts 29 carrying will be effected to the tens order just after the stud 20 has restored the cam arm 11 to its normal position. At this time, cam contacts CB5 and CF6 are closed for a short period. The carry circuit is from line 87 through contacts CF6, CB5, wire 113 to contacts 114 of the units order, which contacts are normally closed, contacts 29 which were closed during the adding portion of the cycle and latched in such position, wire 115, contacts 116 normally closed, wire 110 of the tens order accumulator pinion, contacts 111, accumulator magnet 16 of the tens order, wire 112, circuit breaker contacts CB1, to the line 86. This will move the pin 8a into cooperation with the pinion 1 of the tens order to turn it an additional step. The stud 20a will then restore the arm 11 once more.

If the accumulator pinion of the tens order happens to be standing at nine when it receives a carry from the units order, it will, of course, be necessary when adding one to the tens order thus turning it to the zero position, to carry one to the next highest order. This is effected through the contacts 28 of the tens order which, as we have seen, is closed by the cooperation of the cam projection 22 with the depressed portion of the carry cam 21 at 30. The circuit is from line 87 through contacts CF6, CB5, wire 113, contacts 114 of the units order, contacts 29, wire 115, contacts 116 to wire 110 of the tens order as previously traced. With contacts 28 closed, the current besides actuating magnet 16 also passes through contacts 28, wire 115 of the tens order, contacts 116 of the tens order and from there to the next higher order in the same manner as from contacts 116 of the units order to the tens order. In the present instance, the next higher order is omitted to simplify the diagram.

*Printing*

In order to effect printing of the data taken from the card simultaneously with the accumulation of such data, an additional plug wire 117 may be connected from the brush 101 to the plug socket 118. Now, simultaneously with the closing of the circuit through the accumulating magnet 16, a separate circuit will be closed through the printing magnet 71. The circuit is from the line 87, through contacts 105, contacts CF4, brush 104, roller 103, perforation sensing brush LB, plug wire 117 to socket 118, contacts 119 normally closed, printing magnet 71, wire 120, contacts CB1 to the line 86.

*Balance accumulating*

If balance accumulating is to be effected using accumulator A for credit data and accumulator B for debit data, an additional plug wire 107a will be connected from the brush LB, or socket 108, to the plug socket 108a of accumulator B. Accumulator A will accumulate the true number in the manner just described while accumulator B will be normally set to accumulate complements of the data added in accumulator A.

Credit cards will be distinguished from debit cards by the presence of a perforation in the X position of a certain one of the columns of the debit card. If the card is a credit card, the data analyzed by the sensing brushes LB will be run into the credit accumulator A in the manner described. The complement of the number will be run into the debit accumulator B through a circuit over the plug connection 107a. The pinion wheel of the accumulator B starts to turn at the beginning of the adding cycle and is stopped when the circuit is closed through the plug connection 107a.

The accumulator wheels are caused to commence rotating at the beginning of the adding cycle by energization of the electromagnet 44 of accumulator B. When the cam contacts CF3 close, the circuit is completed through the shifting magnet 44 of the B accumulator as follows: from the line 87 through contacts CF3, contacts 121, magnet 44 of B accumulator, wire 122, to the other side of the line 86. This, as we have seen shifts the shaft carrying all of the B accumulator wheels so that they commence to turn at the beginning of the adding cycle. Now when the circuit is closed through the perforation in the card, the magnet 16 of accumulator B will be energized and will disconnect the operating pins 8 from the accumulator wheel for the remainder of the adding cycle so that the wheel will stop after having accumulated the complement. The circuit through the magnet 16 is from line 87, through contacts 105, cam contacts CF4, brush 104, roller 103, sensing brush LB, plug connections 107, 107a to socket 108a, contacts 109 of accumulator B, wire 110, contacts 111, magnet 16, wire 112, wire 120, contacts CB1, back to the line 86.

If the card is a debit card, then when the X perforation in the particular column used for this designation reaches its sensing brush UB of the upper brushes a circuit will be closed from the line 87 through wire 98, contacts 94, contacts CF2, pick up relay magnet 123, plug connection 124 to the particular sensing brush UB, roller 102, contacts CB1, to the line 86. Relay magnets 123 and 123a have a common core.

Energization of relay 123 closes contacts 126 and this in turn closes a circuit through the relay magnet 123a as follows: from the line 86, wire 127, relay 123a, contacts 126, contacts CF3, to the line 87. The circuit through the pick up relay 123 is momentary and the contacts 126 are then held closed by the relay 123a. A parallel circuit will also be closed through magnets 128 from line 86, wire 127, magnet 128, contacts 126, contacts CF3 to the other side of the line. A circuit will also be closed at the time of closure of contacts CF3, through magnet 44 of the B accumulator over the circuit previously traced but the magnet 44 is slower in its action than relay magnet 128 so that before magnet 44 operates, relay 128 will have opened contacts 121 and closed contacts 121a. This will then close the circuit from line 86, through wire 122, magnet 44 of accumulator A, contacts 121a, contacts CF3 to the line 87. This will cause the accumulator wheels of accumulator A to be shifted so that they will commence to operate at the beginning of the adding cycle, whereas the wheels of the accumulator B will not be operated until a perforation in the particular column of the card is sensed. Thus, the accumulator B will now receive the true number when the card is a debit or X card and the accumulator A whose wheels are now demeshed at the time of sensing of the perforation will receive the complement.

The elusive one

Whenever one of the accumulators receives a complementary number it is necessary to add the elusive 1 into the units order of that accumulator. This is effected at the time that the X perforation position is sensed by the upper brushes. In other words, the elusive 1 is added one cycle before the accumulation of data from the other columns on the card is effected.

The accumulation of the elusive 1 is effected by actuating the adding magnet 16 of the units order of the particular accumulator when the X perforation is sensed. The circuit is from line 87 through wire 98, contacts 94, contacts CF5, plug connection 129, normally closed contacts 130 if the card is not an X card, wire 110, contacts 111, magnet 16, wire 120, contacts CB1 to the line 86. The elusive 1 will then be added in the accumulator B. But if an X perforation is sensed, the relay 128 will open contacts 130 and close contacts 130a and the circuit just traced to plug connection 129 will be diverted to contacts 130a, plug connection 131, wire 110 and magnet 16 of the units order of accumulator A, wire 112, 120, contacts CB1 to the other side of the line.

Total printing

Assuming that the feeding of cards has stopped and that a total of data accumulated is to be taken, the total key 132 will be depressed. This will close contacts 132a and 132b. If all of the accumulators are to be used for normal adding, a plug connection 133 will not be used so that contacts 132a will be ineffective but contacts 132b will close a parallel circuit through the several total print magnets TP1 to TP5 inclusive. The circuit is from line 86, through the TP magnets and their respective cam contacts CB—A to CB—D, cam contacts CB8, total key contacts 132b, contacts 134 now closed, wire 135 to the line 87. Total print relay magnets TP5 will close contacts 136 to hold the circuit after the total key is released, the circuit now being from the line 86, through the total print contacts 136, cam contacts CB12, wire 138, wire 135 to the line 87. Since normal total taking is being effected, the plug wires 139b, 139a are also omitted and the several orders of all of the accumulators are plug connected by plug wires 140.

The total print relay magnet TP5 also closes contacts 141, 141a. This causes each of the shift magnets 44 to be energized to cause the accumulator wheels to begin turning at the beginning of the cycle. The circuit through these magnets is from the line 86 through wire 122, magnets 44, contacts 141, 141a, wire 142, contacts 134, wire 135 to the line 87. As the accumulator wheels now rotate turning through their successive positions as usual, when they reach their nine value positions, they will close their contacts 28 as previously described and as they turn the next step to zero, they will close the contacts 29. In order to print the value standing in the accumulator wheel, the printing magnet 71 will be energized when the accumulator wheel reaches its nine position, by the closure of the contacts 28. The circuit is from the line 86 through contacts CB1, wire 120, through magnet 71, contacts 119a, closed by total print magnet TP5, plug connection 140, wire 110, contacts 28, wire 115, contacts 116a, closed by total print relay TP2, wire 113, contacts CB5, CF6 to the line 87.

Figure 1:
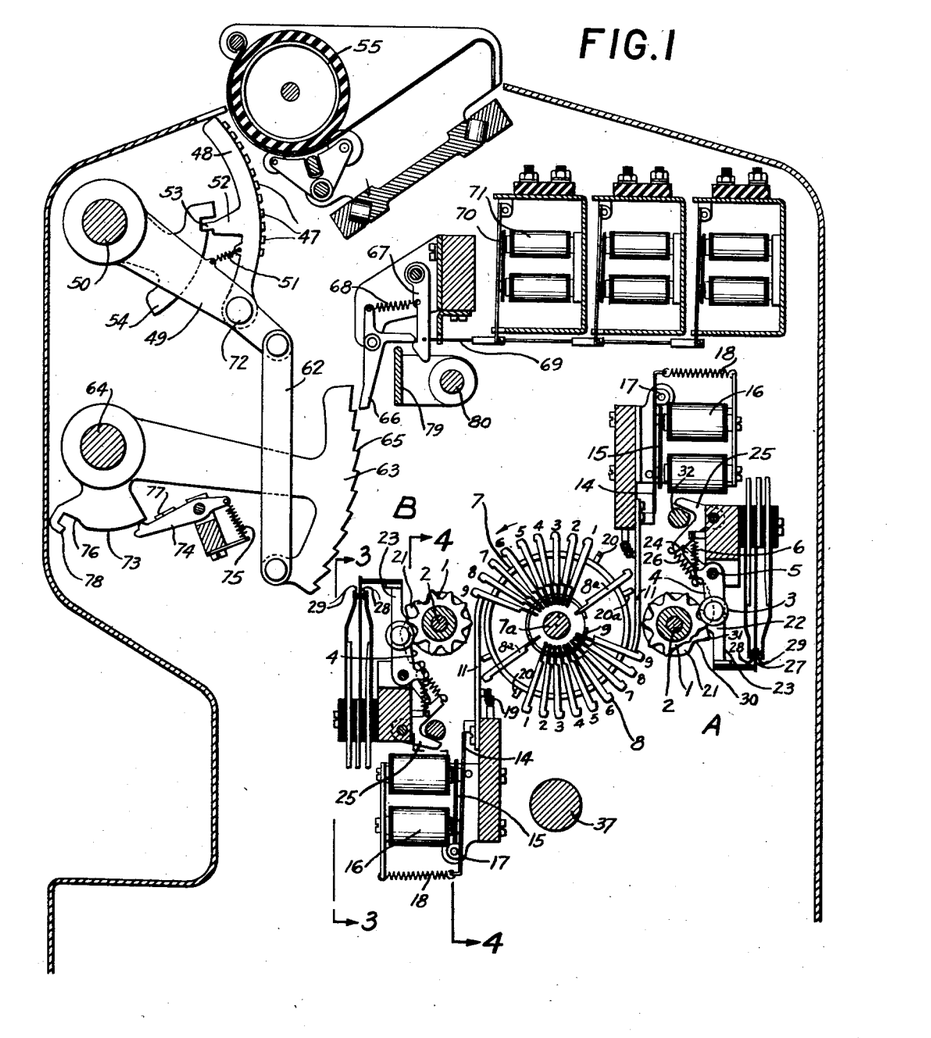
Fig. 1 is a side elevation, partly in section, of a machine embodying my invention.
Figure 2:
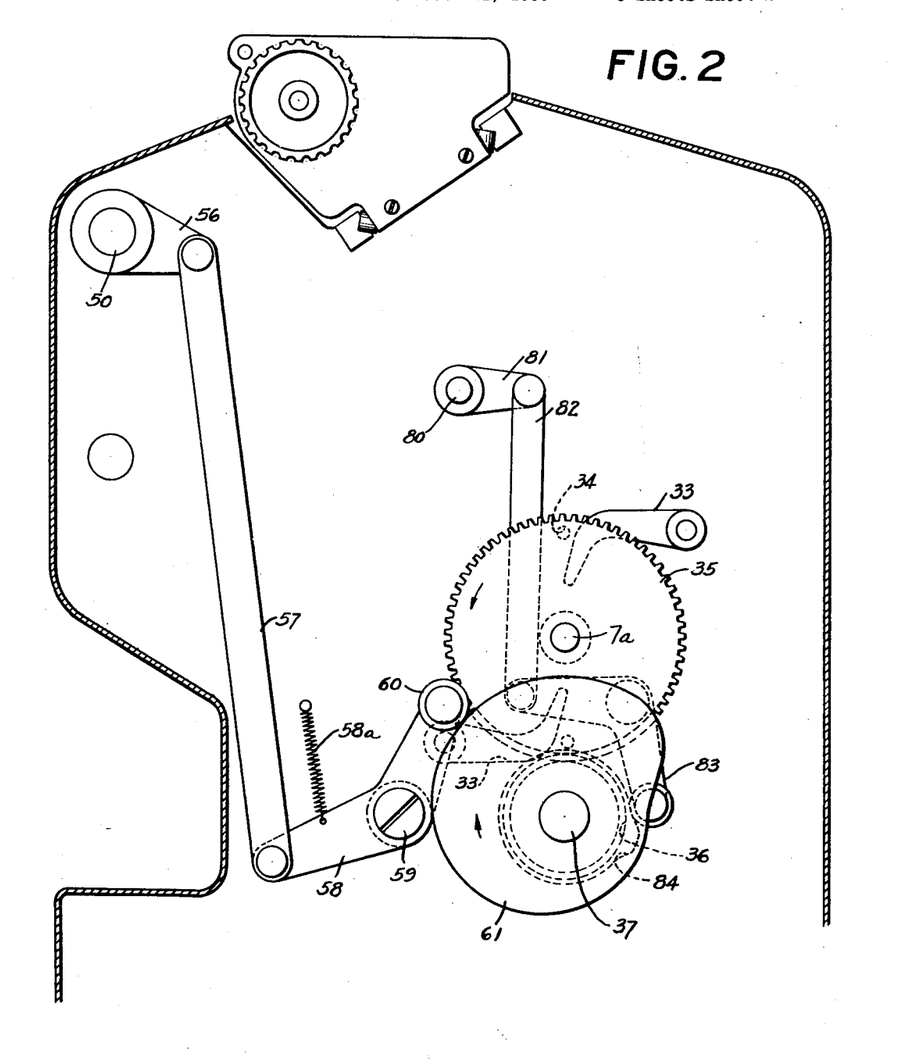
Fig. 2 is a similar view showing means for operating the mechanisms shown in Fig. 1.

The energization of magnet 71 operates the printing type bar 48 of Fig. 1 as previously described to effect printing by the type element 47 in printing position at that moment. As the accumulator wheel turns to the next step which is its zero position, contacts 29 will be closed and this will close a circuit through the accumulator magnet 16 to demesh the remaining pins from the accumulator wheels so that they will stand in their zero positions. The circuit is from the line 86, through contacts CB1, wire 120, wire 112, magnet 16, contacts 111a closed by relay TP4, contacts 114a closed by relay TP3, wire 143, contacts 29, wire 115, contacts 116a, wire 113, contacts CB5, CF6 to the line 87. This will leave the accumulators in their zero positions ready for further or new accumulating operations.

It may be stated at this point that TP5 relay also opens contacts 91 in the card feed circuit to prevent the possibility of starting the card feed mechanism by accidental depression of the start key 88 while the machine is still performing totaling operations.

Balance total printing

If the machine has been set to accumulate credit values in accumulator A and debit values in accumulator B as previously assumed, the plug connection 133 will be made from total key contacts 132a to the highest order accumulator wheel of accumulator A. Also the various plug connections 140 will be omitted and the plug connections 139 and 139a will be made through the balance selection contacts 144, 144a. Upon depression of the total key, the total print relays TP1 to TP5 inclusive will be energized as before and the TP5 relay will close contacts 141, 141a to energize the shift magnets 44 so that all accumulators will be meshed for operation at the beginning of the cycle. The total will be printed from either accumulator A or accumulator B depending upon which of these accumulators contains the value representing the difference between the two accumulators. This is determined by testing the accumulator wheel of accumulator A in its highest order. If this wheel is standing at nine indicating that the accumulator has passed through zero, having accumulated a greater complementary value, this will indicate that the difference or balance is contained in accumulator B. If the highest order of accumulator A does not contain the nine then the balance is in accumulator A and the total will be printed from that accumulator. Assuming that the highest order in accumulator A does contain a nine a circuit will be closed through the plug connection 133 when the total key 132 is depressed to close contacts 132a.

The circuit is from line 86 through relay R4, contacts 132a, plug connection 133, contacts 116 (relay TP2 is slow acting and has not yet opened contacts 116), wire 115, contacts 28 closed by the nine position of the highest order in accumulator A, wire 110, wire 145, contacts CB9, contacts 146 to the line 87. The closing of this circuit energizes relay R4 which acts more quickly than relay TP2 and thus becomes energized before the contacts 116 open. Relay R4 closes contact 147 and establishes a holding circuit for itself from line 86 through relay R4, contacts 147, cam contacts CB7, wire 135 to the line 87. Relay R4 also closes contacts 148 and this establishes a circuit through the balance selection relay 149, the circuit being from line 86 through wire 127, relay 149, contacts 148, contacts CF3 to the line 87. Relay 149 opens contacts 144 and closes contacts 149a to provide a stick circuit through contacts CF3. Relay magnet 149 also closes contacts 144a. This disconnects the plug wire 139a which is connected to accumulator A and connects plug line 139b which runs to accumulator B so that the total printing will be effected from the accumulator B over the following circuit: from the line 86, through contacts CB1, wire 120, printing magnet 71 of accumulator B, contacts 119a which are closed for total printing, plug connection 139, contacts 144a, plug connection 139b, wire 110, contacts 28 when the accumulator reaches its nine position, wire 115, contacts 116a, wire 113, contacts CB5, CF6 to the line 87.

The accumulators will be demeshed from the pins 8 as they turn the next step to zero position and close their contacts 29 as previously described. The accumulator wheels of the accumulator A which are also operated during the total printing by reason of the operation of their shift magnet 44, will also be demeshed from the pins 8 when their ten position contacts 29 are closed in the usual manner.

Assuming now that the highest order in the credit accumulator A does not contain a nine at the time that the total key is depressed, the contacts 28 of this accumulator will be open so that the circuit will not be closed through the relay R4. The balance selection magnet 149 will not be energized and the contacts 144a will remain open and contacts 144 will remain closed. The printing circuit will then be as follows: from line 86 through contacts CB1, wire 120, printing magnet 71 (the same printing magnet as used in printing from accumulator B), contacts 119a, plug connection 139, contacts 144, plug connection 139a running to the accumulator A, wire 110, contacts 28, wire 115, contacts 116a, wire 113, contacts CB5, CF6 to the line 87.

The accumulator wheels of both accumulators will be demeshed from the related sets of pins 8 when their respective contacts 29 close in the usual manner.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a machine of the class described, an accumulator pinion, a movable actuator having a plurality of pins shiftable relative thereto, means for shifting said pinion laterally into the path of said pins for engagement thereby, and means controlled by said pinion when it reaches a predetermined position for shifting the pins of said actuator out of engaging position to prevent further actuation of said pinion.

2. In a machine of the class described, an accumulator pinion, a movable actuator having a plurality of pins engaging said pinion and shiftable relative to said actuator out of engagement with said pinion, means for shifting said pins relative to said actuator out of engagement with said pinion, and means controlled by said pinion when it reaches a predetermined position for causing said last named means to shift the pins relative to said actuator out of engaging position to prevent further actuation of said pinion.

3. In a machine of the class described, in combination, an accumulator pinion, a rotatable value entering actuator therefor comprising a plurality of radially disposed pins shiftable to effective position into engagement with said pinion, a camming means normally out of the plane of said pins but movable into the plane thereof to engage and shift a number of pins to effective position during the rotation of said actuator, entry controlling determining means operable synchronously with the rotation of said actuator to determine an entry to be made in said pinion, and means controlled by said entry controlling means for causing upon the determination of an entry the movement of said camming means for shifting a number of pins to effective position to engage said pinion to enter therein a value determined by said entry controlling means.

4. In a machine of the class described, in combination, an accumulator pinion, a rotatable value entering actuator therefor comprising a plurality of radially disposed pins shiftable relative to said actuator into engagement with said pinion, means for analyzing value representing perforations of a record synchronously with the rotation of said actuator for selecting a predetermined number of pins to be shifted to engage said pinion, means normally out of the plane of said pins and movable into engagement with said pins for shifting them into engagement with said pinion, and means controlled by said analyzing means for causing upon the analysis of a value representing perforation the movement of said shifting means for shifting a number of pins to engage said pinion to enter therein a value determined by said analyzing means.

5. In a machine of the class described, an accumulator comprising at least two denominationally ordered accumulator pinions, a rotatable entry effecting actuator for a higher order pinion comprising a set of radially disposed pins shiftable relative to said actuator for engagement with the related pinion, electrical means for said higher order actuator for causing one or more of said pins to be shifted to engage a related pinion while the actuator is rotating, and electrical control means controlled by a pinion of the next lower order as said pinion passes from 9 to 0 for causing the electrical means of the higher order to effect the shifting of one of said pins of said actuator for engagement with the related higher order pinion to effect a unit carrying operation therein.

6. In a machine of the class described, an accumulator pinion mounted on a longitudinally movable shaft, a movable actuator therefor comprising a plurality of pins laterally shiftable relative thereto and normally out of the plane of the accumulator pinion, means for longitudinally moving said shaft on total taking operations to shift said pinion into engagement with said pins, and means controlled by said pinion when it reaches a predetermined position for laterally shifting the pins of said actuator out of engaging position to prevent further actuation of said pinion.

7. In a machine of the class described, an accumulator pinion, a rotatable actuator therefor comprising a plurality of radial pins shiftable relative to said actuator from an effective position in engagement with the pinion to an ineffective position out of engagement with said pinion, entry controlling means for determining an entry to be subtracted, and means controlled by said controlling means upon the determination of an entry for shifting a number of pins out of engaging position with said pinion to prevent actuation of said pinion by these shifted pins to thereby cause a subtracting operation to be effected therein by the pins engaged with the pinion.

8. In a machine of the class described, an accumulator pinion, a uni-directionally rotatable actuator therefor comprising a plurality of radial pins shiftable relative to said actuator and normally out of engagement with said pinion, means for shifting said pins into engagement with said pinion or out of engagement with said pinion if the pins are already in engagement therewith, entry controlling means for determining an entry to be effected in said pinion, means controlled by said entry controlling means for causing upon determining an entry to be effected the operation of said shifting means to shift a number of pins into engagement with said actuator when said pins are out of engagement with the pinion, to effect an adding operation therein, controlling means for determining a subtraction operation, means for shifting said pinion into engagement with said pins, means controlled by said subtraction controlling means for causing the operation of said last named shifting means to shift said pinion into engagement with said pins, said entry controlling means causing when said pinion is in its shifted position the operation of the first named shifting means to cause certain of the pins to be shifted out of engagement with the pinion whereby a complementary subtractive entry is effected in said pinion.

ALBERT W. MILLS.